(12) United States Patent
March Nomen et al.

(10) Patent No.: US 10,718,315 B2
(45) Date of Patent: Jul. 21, 2020

(54) LIGHTING RECEPTOR FOR A WIND TURBINE BLADE

(71) Applicant: SIEMENS GAMESA RENEWABLE ENERGY INNOVATION & TECHNOLOGY, S.L., Sarriguren (ES)

(72) Inventors: Victor March Nomen, Sarriguren (ES); Juan Madoz Zabalegui, Sarriguren (ES); José Manuel Martinez Olmo, Madrid (ES)

(73) Assignee: SIEMENS GAMESA RENEWABLE ENERGY INNOVATION & TECHNOLOGY, S.L., Sarriguren (ES)

( * ) Notice: Subject to any disclaimer, the term of this patent is extended or adjusted under 35 U.S.C. 154(b) by 786 days.

(21) Appl. No.: 15/149,490

(22) Filed: May 9, 2016

(65) Prior Publication Data
US 2016/0348652 A1  Dec. 1, 2016

(30) Foreign Application Priority Data
May 26, 2015 (ES) .................................. 201500381

(51) Int. Cl.
*F03D 80/30* (2016.01)
*H02G 13/00* (2006.01)
*F03D 1/06* (2006.01)

(52) U.S. Cl.
CPC .......... *F03D 80/30* (2016.05); *F03D 1/0675* (2013.01); *H02G 13/00* (2013.01);
(Continued)

(58) Field of Classification Search
CPC .................. F03D 1/0675; F03D 80/30; H02G 13/00–13/80; F05B 2230/60; F05B 2240/30; F05B 2250/36
See application file for complete search history.

(56) References Cited

U.S. PATENT DOCUMENTS 6,979,179 B2 * 12/2005 Møller Larsen ........ F03D 80/30
                                                415/4.3
8,430,631 B2 *  4/2013 Olsen ..................... F03D 80/30
                                                416/1
(Continued)

FOREIGN PATENT DOCUMENTS

CN        101498277 A     8/2009
CN        101668945 A     3/2010
(Continued)

OTHER PUBLICATIONS

Tungsten datasheet (Year: 2019).*
(Continued)

*Primary Examiner* — Kenneth Bomberg
*Assistant Examiner* — Julian B Getachew
(74) *Attorney, Agent, or Firm* — Ladas & Parry LLP

(57) ABSTRACT

The invention provides a lightning receptor arrangement (11, 12) for a wind turbine blade (10) comprising at least a self-threading screw (21) having a head (23) and a threaded shaft (25) as a the external metallic receptor element for receiving a lightning strike in one side of the wind turbine blade (10) and an internal element comprising an electrically conductive block (20) configured with at least an unthreaded hole (41) for cooperating with said threaded shaft (25) and connected to a down conductor (18) of a grounding arrangement. The internal element is joined to at least a shell (17) of the wind turbine blade (10) with an adhesive force capable of withstanding the torque applied to the self-threading screw (21) for threading it to the unthreaded hole (41).

10 Claims, 4 Drawing Sheets

(52) U.S. Cl.
CPC ....... *F05B 2230/60* (2013.01); *F05B 2240/30* (2013.01); *F05B 2250/36* (2013.01); *Y02E 10/721* (2013.01); *Y02P 70/523* (2015.11)

(56) References Cited

U.S. PATENT DOCUMENTS

| | | |
|---|---|---|
| 2004/0028528 A1 | 2/2004 | Flemming |
| 2009/0196751 A1 | 8/2009 | Jacobsen et al. |
| 2010/0090472 A1 | 4/2010 | Berthelsen |
| 2012/0020791 A1* | 1/2012 | Flemming .............. H02G 13/00 416/146 R |
| 2013/0115073 A1* | 5/2013 | Thiel ...................... F03D 80/00 415/208.1 |
| 2014/0112787 A1 | 4/2014 | Bracht |

FOREIGN PATENT DOCUMENTS

| | | |
|---|---|---|
| CN | 201805143 U | 4/2011 |
| CN | 102971530 A | 3/2013 |
| CN | 203232964 U | 10/2013 |
| CN | 203339639 U | 12/2013 |
| EP | 1 664 528 A1 | 9/2004 |
| EP | 1965076 A1 | 9/2006 |
| EP | 1 950 414 A2 | 7/2008 |
| EP | 2110552 A1 | 10/2009 |
| EP | 2 141 356 A1 | 1/2010 |
| EP | 2 722 522 A1 | 4/2014 |
| WO | 0248546 A1 | 6/2002 |
| WO | 2005/026538 A1 | 3/2005 |
| WO | 2008101506 A2 | 8/2008 |
| WO | 2014124642 A1 | 8/2014 |
| WO | 2015055213 A1 | 4/2015 |

OTHER PUBLICATIONS

C23000 alloy datasheet (Year: 2019).*
"How do you use self-tapping screws" (https://home.howstuffworks.com/self-tapping-screws.htm), dated Aug. 19, 2012 via the Internet Archives (Year: 2012).*
Hanbook of Plastics Joining: A Practical Guide (p. 107) (Year: 1997).*
Espacenet English abstract of CN 101668945 A.
Espacenet English abstract of CN 101498277 A.
Espacenet English abstract of CN 102971530 A.
Espacenet English abstract of CN 203232964 U.
Espacenet English abstract of CN 201805143 U.
Espacenet English abstract of CN 203339639 U.
McNiff Brian: "Wind Turbine Lightning Protection Project 1999-2001"; NREL/SR-50-31115; published May 2002.

* cited by examiner

LIGHTING RECEPTOR FOR A WIND TURBINE BLADE

FIELD OF THE INVENTION

The invention relates to a lightning receptor arrangement for a wind turbine blade.

BACKGROUND

Lightning protection system for wind turbine blades usually comprises lightning receptor arrangements comprising an external metallic receptor element and an electrically conductive internal block connected to a down conductor of a grounding arrangement of the wind turbine. Once captured lightning currents by the receptor element must be transmitted to the electrically conductive internal block that connect the receptor element to the down conductor.

Lightning receptor arrangements are mainly located at the tip of the blade (such as those disclosed in EP 2 722 522 A1. US 2004/028528 A1 and EP 2 141 356 A1) but they can also be located in other blade regions such as that disclosed in EP 1 664 528 A1.

As shown in FIGS. 1a, 1b and 1c a known lightning receptor arrangement 8 located far from the tip of the wind turbine blade 10 comprises as receptor element a bolt 14 connected to an electrically conductive internal block 15 which is joined to a shell 17 of the wind turbine blade 10 and connected to the down conductor 18.

The bolt 14 and the electrically conductive internal block 15 are mechanically connected by a threaded connection 31 between them and electrically connected both by the threaded connection 31 and by the contact surface 16 (a flat surface) after applying a tightening torque to the bolt 14. In other embodiments the contact surface is a surface of conical geometry.

The contact of the bolt 14 and the electrically conductive internal block 15 through a flat or conical surface is needed for avoiding a physical damage on the threaded connection 31 between them because in this arrangement most of the lightning currents are transferred through the contact surface 16. Otherwise, physical damage on a bolted joint can occur because of the flow of lightning currents.

As shown in FIGS. 3a, 3b and 3c a known lightning receptor arrangement 9 located in a tip region of the wind turbine blade 10 comprises as receptor elements bolts 14 in both sides of the wind turbine blade 10 connected to an electrically conductive internal block 15 which is joined to at least one of the shells 17, 19 and connected to the down conductor 18. The mechanical and electrical connections between bolts 14 and the electrically conductive internal block 15 are similar to those described for the lightning receptor arrangement 8.

The transmission of lightning currents from the receptor elements 14 to the electrically conductive internal block 15 must ensure a correct lightning transmission and permit the adjustment of the receptor elements 14 to the outer surface of the shells 17, 19 to comply with aerodynamic as well as noise reduction requirements.

However in lightning receptor arrangements 8, 9 a gap G between the outer surfaces of receptor elements 14 and shells 17, 19 (see FIGS. 1c and 3c) can take place due to variations of shell thickness as a consequence of tolerances during its manufacturing process causing an incorrect position of the electrically conductive internal block 15 or an unexpected dimensional variation between the head of a receptor element 14 and the surrounding shell.

This invention is directed to the solution of this drawback.

SUMMARY OF THE INVENTION

The invention provides a lightning receptor arrangement for a wind turbine blade comprising at least a self-threading screw having a head and a threaded shaft as a the external metallic receptor element for receiving a lightning strike in one side of the wind turbine blade and an internal element comprising an electrically conductive block configured with at least an unthreaded hole for cooperating with said threaded shaft and connected to a down conductor of a grounding arrangement. The material of the self-threading screw has higher hardness and lower ductility than the material of the electrically conductive block and the threaded shaft and the unthreaded hole are dimensioned so that the threaded connection between them can transmit all lightning currents received by the self-threading screw. The internal element is joined to at least a shell of the wind turbine blade with an adhesive force capable of withstanding the torque applied to the self-threading screw for threading it to the unthreaded hole.

Advantageously, the internal element further comprises an insulating coating for the electrically conductive block for preventing its corrosion and avoiding a lightning strike.

Advantageously the threaded shaft and the unthreaded hole are also dimensioned so that its threaded connection can have a length that assures a correct alignment of the head of the self-threading screw with the outer surface of the shell of the wind turbine blade for aerodynamic continuity purposes.

Advantageously the threaded shaft and the unthreaded hole have a cylindrical shape and the ratio between their respective diameters D1, D2 is comprised between 1.03-1.60.

Advantageously the self-threading screw is made of steel, stainless steel or tungsten and the electrically conductive block is made of aluminum, copper or brass.

In an embodiment for a tip region of the wind turbine blade, the lightning receptor arrangement further comprises an additional self-threading screw as a metallic receptor element for receiving a lightning strike in the opposite side of the wind turbine blade having a head and a threaded shaft and the electrically conductive block is also configured with an additional unthreaded hole for cooperating with the threaded shaft of the additional self-threading screw.

Other features and advantages of the present invention will be understood from the following detailed description in relation with the enclosed figures.

DETAILED DESCRIPTION OF THE INVENTION

Figure 1A:
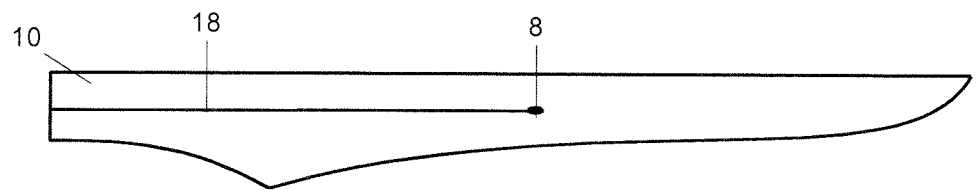
FIG. 1a is a schematic plan view of a wind turbine blade with a lightning receptor arrangement known in the art placed far from the tip of the blade and FIGS. 1b and 1c are sectional views of said lightning receptor arrangement having, respectively, the receptor element aligned and misaligned with respect to the surrounding shell.
Figure 1B:
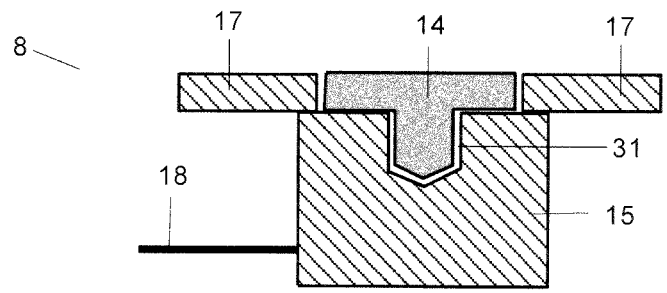
Figure 1C:
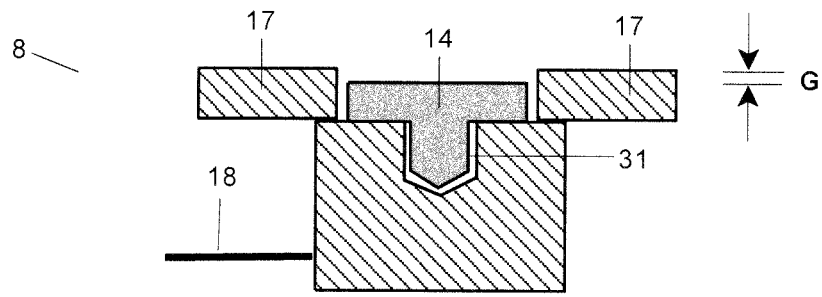
Figure 2A:
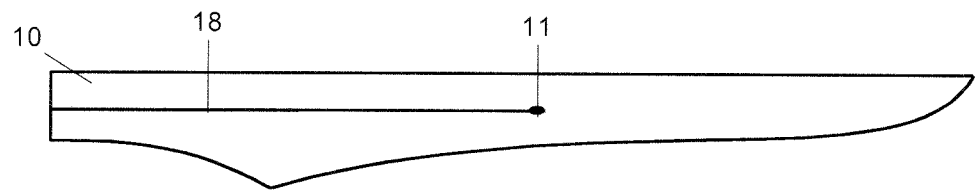
FIG. 2a is a schematic plan view of a wind turbine blade with a lightning receptor arrangement according to the invention placed far from the tip of the blade.
Figure 2B:
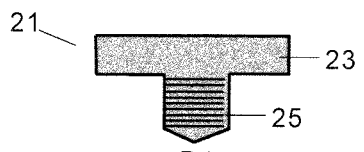
FIG. 2b is a schematic sectional view of the components of the lightning receptor arrangement and FIG. 2c is a sectional view of said lightning receptor arrangement mounted on the wind turbine blade with the receptor element duly aligned with the surrounding shell.
Figure 2B:
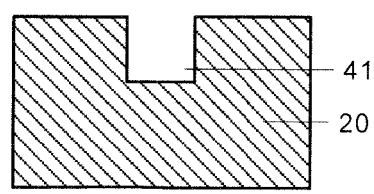
Figure 2C:
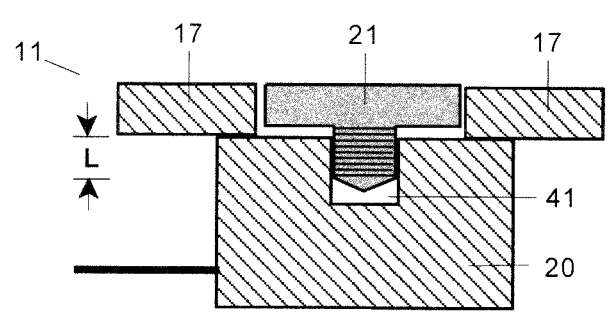
Figure 3A:
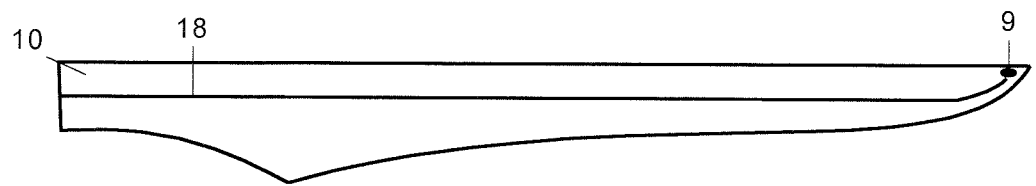
FIG. 3a is a schematic plan view of a wind turbine blade with a lightning receptor arrangement known in the art placed in the tip region of the blade and FIGS. 3b and 3c are sectional views of said lightning receptor arrangement having, respectively, the receptor element aligned and misaligned with respect to the surrounding shell.
Figure 3B:
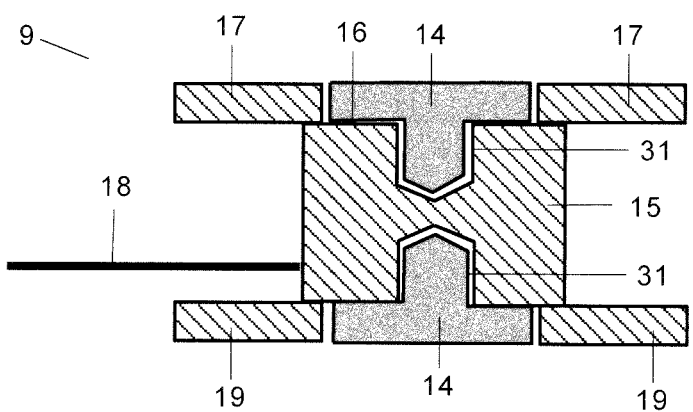
Figure 3C:
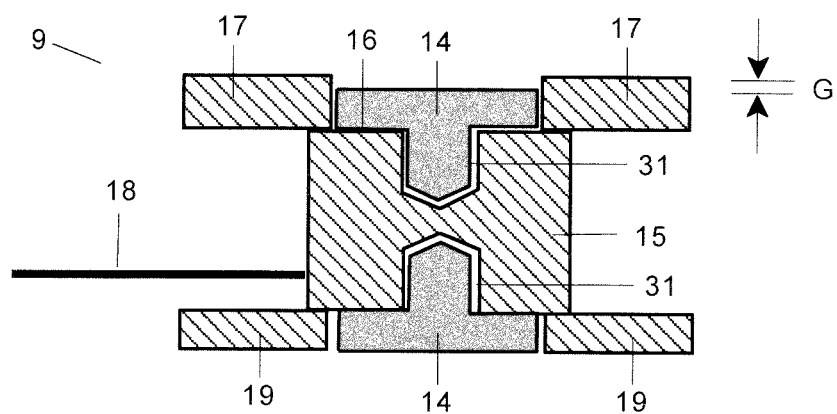

A lightning receptor arrangement 11 (see FIGS. 2a, 2b, 2c) placed far from the tip of a wind turbine blade 10 comprise a self-threading screw 21 as receptor element and, as internal element, an electrically conductive block 20 configured with an unthreaded hole 41 for cooperating with the self-threading screw 21 so that their threaded connection allows to transmit lightning currents between both components without the need of a "flat or conical contact surface" as in the prior art.

The self-threading screw 21 has a threaded shaft 25 of diameter D1, a drilling tip provided at one end of the threaded shaft 25, and a head 23 provided at an opposite end of the threaded shaft 25. The head 23 is provided with rotation transmitting means for a screw-driving tool such as screw-driving bit or wrench.

The electrically conductive block 20 is configured with an unthreaded hole 41 of diameter D2 slightly lesser than the diameter D1 of the self-threading screw 21 to allow a strong threaded connection between them applying a torque to the head 23 of the self-threading screw 21 with a screw-driving tool. In particular the ratio between D1 and D2 shall be comprised between 1.03-1.60. This arrangement requires that the electrically conductive block 20 be joined to the shell 17 with an adhesive force capable of withstanding said torque.

The self-threading screw 21 shall be made of a material with higher hardness and lower ductility respect to the material of the electrically conductive block 20. Typical materials for the self-threading screw 21 are steel, stainless steel or tungsten, while typical materials for the electrically conductive block 20 are aluminum, copper or brass.

Given the possibility of variations of the thickness of the shell 17 the threaded shaft 25 of the self-threading screw 21 and the unthreaded hole 41 of the electrically conductive block 20 shall be dimensioned so that their threaded connection can have for all the possible thickness variation range a length L (see FIG. 2c) that assures, on one side, the strong electrical connection needed for transmitting all lightning currents through said threaded connection and, on the other side, the alignment of the head 23 of the self-threading screw 21 with the outer surface of the shell 17 of the wind turbine blade 10 for aerodynamic continuity purposes.

Figure 4A:
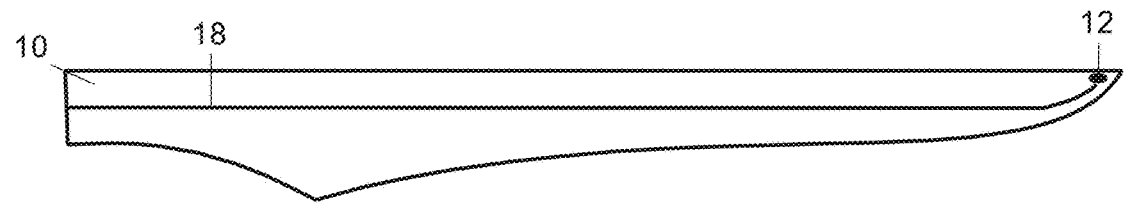
FIG. 4a is a schematic plan view of a wind turbine blade with a lightning receptor arrangement according to the invention placed in the tip region of the blade.
Figure 4B:
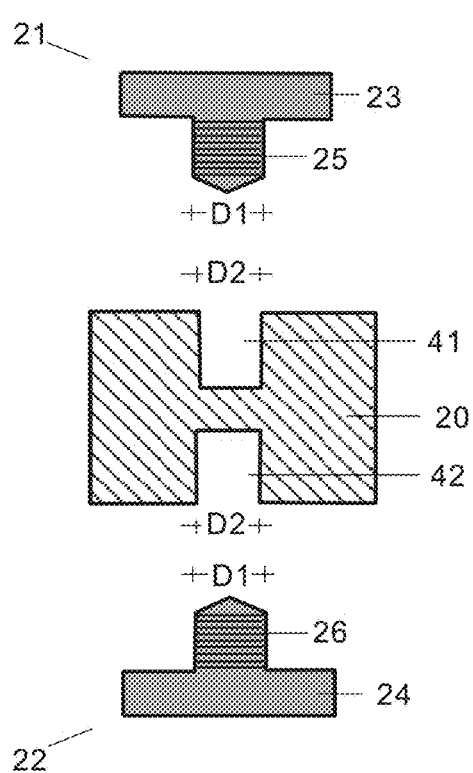
FIG. 4b is a schematic sectional view of the components of the lightning arrangement and FIG. 4c is a sectional view of said lightning receptor arrangement mounted on the wind turbine blade with the receptor elements duly aligned with the surrounding shells.
Figure 4C:
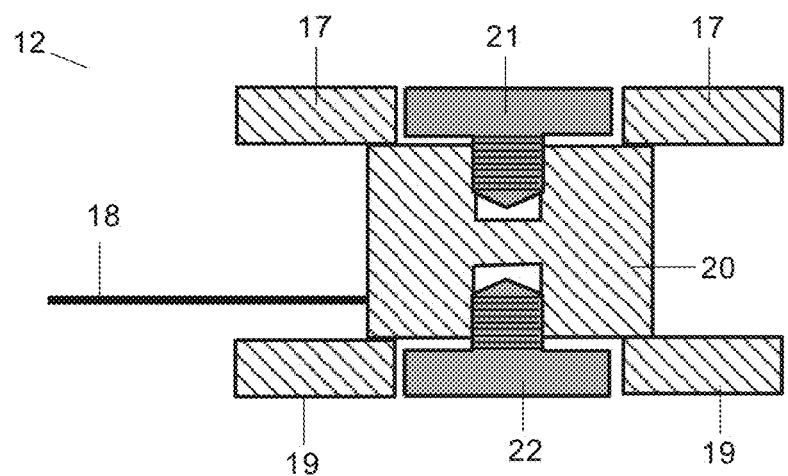

A lightning receptor arrangement 12 (see FIGS. 4a, 4b, 4c) placed in the tip region of a wind turbine blade 10 comprises an additional self-threading screw 22, having a threaded shaft 26 of diameter D1, a drilling tip provided at one end of the threaded shaft 26, and a head 24 provided at an opposite end of the threaded shaft 26, as receptor element at the other side of the wind turbine blade 10 and the electrically conductive block 20 is configured with an additional unthreaded hole 42 for cooperating with the additional self-threading screw 22 so that their threaded connection allows to transmit lightning current between both components without the need of a "flat or conical contact surface" as in the prior art.

The features of the threaded connection between the additional self-threading screw 22 and the additional unthreaded hole 42 are similar to that of self-threading screw 21 and unthreaded hole 41.

Figure 5:
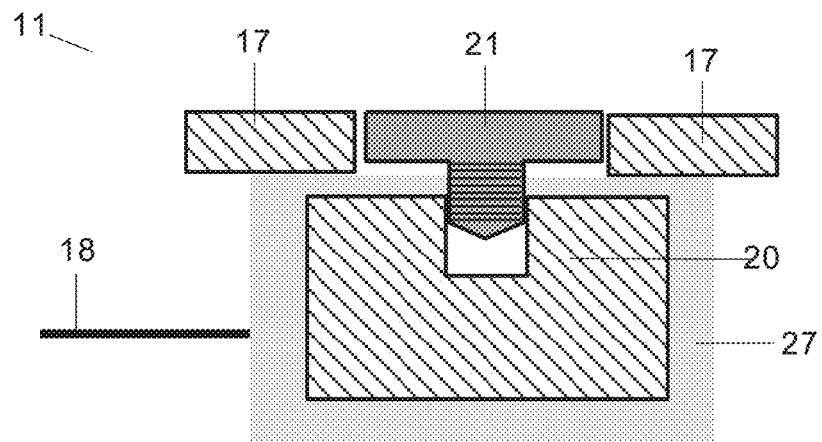
FIGS. 5 and 6 are similar views to FIGS. 2c and 4c including an insulating coating for the electrically conducting block.
Figure 6:
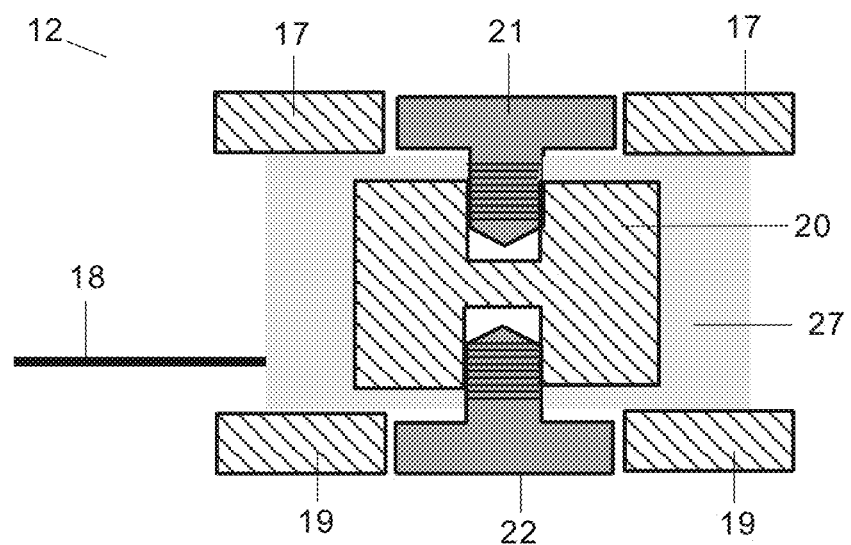

In the embodiments shown in FIGS. 5 and 6, the internal block of lightning receptor arrangements 11, 12 also comprises an insulating coating 27 for the electrically conductive block 20. The insulating coating 27 prevents that the electrically conductive block 20 receives lightning strikes and its corrosion.

Although the present invention has been described in connection with various embodiments, it will be appreciated from the specification that various combinations of elements, variations or improvements therein may be made, and are within the scope of the invention as defined by the appended claims.

The invention claimed is:

1. A wind turbine blade (10) comprising a lightning receptor arrangement (11, 12) comprising at least an external metallic receptor element configured and arranged in one side of the wind turbine blade (10) in an operative position for receiving a lightning strike, an internal element joined at least to an internal side of a shell (17) of the wind turbine blade (10), and a down conductor (18) of a grounding arrangement connected to the internal element, wherein:

the external metallic receptor element is a self-threading screw (21) having a head (23) and a threaded shaft (25);

the internal element comprises an electrically conductive block (20) configured with at least one initially unthreaded hole (41) opening in a surface of the block for cooperating with said threaded shaft (25), wherein the internal element also comprises an insulating coating (27) for the electrically conductive block (20), and wherein the surface of the block abuts and is in direct contact with the insulating coating (27);

a material of the self-threading screw (21) has higher hardness and lower ductility than a material of the electrically conductive block (20), and the threaded shaft (25) and the at least one unthreaded hole (41) are dimensioned so that the self-threading screw is capable of achieving a threaded connection with the conductive block by a process of threading the self-threading screw (21) into the at least one unthreaded hole (41) of the conductive block (20) with formation of threads in the at least one unthreaded hole, wherein the self-threading screw is secured in the block in the operative position with a top of the head of the screw aligned with an external side of the shell and with an empty space between a bottom of the head of the screw and the insulating coating (27), and with the threaded connection transmitting to the block all lightning currents received by the self-threading screw (21); and the internal element is joined to the shell (17) with an adhesive force capable of withstanding a torque applied to the head (23) of the self-threading screw (21) for threading it to the at least one unthreaded hole (41).

2. The wind turbine blade according to claim 1, wherein the at least one unthreaded hole extends into the electrically conductive block a depth such that, with the self-threading screw in threaded connection with the at least one unthreaded hole and secured in the block with the empty space between the head of the screw and the surface of the block, a void exists between a bottom of the self-threading screw and a bottom of the at least one unthreaded hole.

3. A wind turbine blade (10) comprising a lightning receptor arrangement (11, 12) comprising at least an external metallic receptor element configured and arranged in one side of the wind turbine blade (10) in an operative position for receiving a lightning strike, an internal element joined at least to an internal side of a shell (17) of the wind turbine blade (10), and a down conductor (18) of a grounding arrangement connected to the internal element, wherein:
 the external metallic receptor element is a self-threading screw (21) having a head (23) and a threaded shaft (25);
 the internal element comprises an electrically conductive block (20) configured with at least one initially unthreaded hole (41) opening in a surface of the block for cooperating with said threaded shaft (25), wherein the surface of the block abuts and is in direct contact with the internal side of the shell;
 a material of the self-threading screw (21) has higher hardness and lower ductility than a material of the electrically conductive block (20), and the threaded shaft (25) and the at least one unthreaded hole (41) are dimensioned so that the self-threading screw is capable of achieving a threaded connection with the conductive block by a process of threading the self-threading screw (21) into the at least one unthreaded hole (41) of the conductive block (20) with formation of threads in the at least one unthreaded hole, wherein the self-threading screw is secured in the block in the operative position with a top of the head of the screw aligned with an external side of the shell and with an empty space between a bottom of the head of the screw and the surface of the block, and with the threaded connection transmitting to the block all lightning currents received by the self-threading screw (21), and
 the internal element is joined to the shell (17) with an adhesive force capable of withstanding a torque applied to the head (23) of the self-threading screw (21) for threading it to the at least one unthreaded hole (41).

4. The wind turbine blade (10) according to claim 3, wherein each of the threaded shaft (25) and the at least one unthreaded hole (41) has a cylindrical shape, wherein a ratio between a diameter (D1) of a base of the cylindrical shape of the threaded shaft (25) and a diameter (D2) of a base of the cylindrical shape of the at least one hole (41) ranges from 1.03 to 1.60.

5. The wind turbine blade (10) according to claim 3, wherein:
 the self-threading screw (21) is made of steel, stainless steel or tungsten;
 the electrically conductive block (20) is made of aluminium, copper or brass.

6. The wind turbine blade (10) according to claim 3, further comprising an additional self-threading screw (22) as a metallic receptor element in an opposite side of the wind turbine blade (10) for receiving a lightning strike having a head (24) and a threaded shaft (26) wherein:
 the electrically conductive block (20) is also configured with an additional initially unthreaded hole (42) in an opposite surface for cooperating with the threaded shaft (26) of the additional self-threading screw (22);
 the additional self-threading screw has a head and a threaded shaft;
 a material of the additional self-threading screw (22) has higher hardness and lower ductility than the material of the electrically conductive block (20), and the threaded shaft (26) of the additional self-threading screw (22) and the additional unthreaded hole (42) are dimensioned so that the additional self-threading screw is capable of achieving a threaded connection with the additional unthreaded hole, wherein the additional self-threading screw is configured and dimensioned such that the additional self-threading screw can be secured in the block notwithstanding an empty space between the head of the additional self-threading screw and the opposite surface of the block, and the threaded connection can transmit all lightning currents received by the additional self-threading screw (22).

7. The wind turbine blade (10) according to claim 6, wherein the threaded shaft (26) of the additional self-threading screw (22) and the additional unthreaded hole (42) are also dimensioned so that the threaded connection between them has a length that enables an alignment of the head (24) of the additional self-threading screw (22) with a second outer surface of the shell (19) of the wind turbine blade (10) for aerodynamic continuity purposes.

8. The wind turbine blade (10) according to claim 6, wherein each of the threaded shaft (26) of the additional self-threading screw (22) and the additional unthreaded hole (42) has a cylindrical shape, wherein a ratio between a diameter (D1) of a base of the cylindrical shape of the threaded shaft (25) and a diameter (D2) of a base of the cylindrical shape of the additional unthreaded hole (41) ranges from 1.03 to 1.60.

9. The wind turbine blade (10) according to claim 6, wherein the additional self-threading screw (22) is made of steel, stainless steel or tungsten.

10. The wind turbine blade according to claim 3, wherein the at least one unthreaded hole extends into the electrically conductive block a depth such that, with the self-threading screw in threaded connection with the at least one unthreaded hole and secured in the block with the empty space between the head of the screw and the surface of the block, a void exists between a bottom of the self-threading screw and a bottom of the at least one unthreaded hole.

* * * * *